United States Patent
Cheng

(10) Patent No.: US 11,333,820 B2
(45) Date of Patent: May 17, 2022

(54) OPTICAL FILM AND BACKLIGHT MODULE

(71) Applicant: Sunrise Optronics Co., Ltd, Taoyuan (TW)

(72) Inventor: Wen-Feng Cheng, Taoyuan (TW)

( * ) Notice: Subject to any disclaimer, the term of this patent is extended or adjusted under 35 U.S.C. 154(b) by 0 days.

(21) Appl. No.: 17/023,401

(22) Filed: Sep. 17, 2020

(65) Prior Publication Data
US 2021/0088712 A1 Mar. 25, 2021

(30) Foreign Application Priority Data
Sep. 19, 2019 (TW) ................................ 108133718

(51) Int. Cl.
*F21V 8/00* (2006.01)

(52) U.S. Cl.
CPC ......... *G02B 6/0053* (2013.01); *G02B 6/0051* (2013.01); *G02B 6/0068* (2013.01); *G02B 6/0073* (2013.01)

(58) Field of Classification Search
CPC .. G02B 6/0053; G02B 6/0051; G02B 6/0068; G02B 6/0073
See application file for complete search history.

(56) References Cited

U.S. PATENT DOCUMENTS

| | | | | |
|---|---|---|---|---|
| 5,598,280 | A | * | 1/1997 | Nishio ...................... F21V 5/04 349/57 |
| 5,600,462 | A | * | 2/1997 | Suzuki ................. G02B 5/0231 349/112 |
| 2007/0024994 | A1 | | 2/2007 | Whitney et al. |
| 2012/0176772 | A1 | | 7/2012 | Maekawa et al. |
| 2016/0033707 | A1 | * | 2/2016 | Lee ....................... G02B 6/0038 362/607 |
| 2018/0017726 | A1 | * | 1/2018 | Kim ...................... G02B 6/0065 |
| 2019/0018564 | A1 | * | 1/2019 | Chen ..................... G06F 3/0412 |
| 2020/0174317 | A1 | | 6/2020 | Chang |

FOREIGN PATENT DOCUMENTS

| | | | |
|---|---|---|---|
| TW | I252344 | 4/2006 | |
| TW | 1344418 B | 7/2011 | |
| WO | WO-2007086657 A1 * | 8/2007 | ............. G02B 6/005 |

* cited by examiner

*Primary Examiner* — Andrew J Coughlin
*Assistant Examiner* — Jessica M Apenteng

(57) ABSTRACT

An optical film and a backlight module are provided. The optical film includes a first surface and a second surface. The first surface includes a plurality of triangular pyramid structures, the triangular pyramid structure has a vertex, and the vertex extends toward a second surface. The second surface includes a plurality of orthogonal curved structures.

18 Claims, 10 Drawing Sheets

OPTICAL FILM AND BACKLIGHT MODULE

BACKGROUND OF THE INVENTION

Field of the Invention

The present disclosure relates to a film, and more particularly, to an optical film and a backlight module using the optical film.

Description of Related Art

The backlight module is one of the main components of modern LCD screens. The backlight module has multiple light-emitting components to form images displayed on the LCD screen. In order to make the light of the light-emitting components more uniform and to improve the quality of the displayed images of the LCD screen, a diffuser plate is disposed in the direct type backlight module. The diffuser plate has lines, which used physical phenomena such as light refraction, reflection or scattering to make the light more evenly distributed. However, traditional diffuser plate makes the light transmittance poor, so the light-emitting components need higher power to make the light penetrate the diffuser plate, which increase power consumption of the screen.

With the development of technology to improve the contrast of the display device, the light-emitting components of the backlight module are gradually replacing ordinary LEDs with Mini LEDs. Mini LEDs have a smaller light-emitting area, and traditional diffuser plate cannot effectively disperser the light sources. Please refer to FIG. 7A and FIG. 7B. FIG. 7A is a diagram of a backlight module, and FIG. 7B is a diagram showing the optical simulation result. The backlight module 20 includes a reflective sheet 21, a Mini LED array 22, a traditional diffuser plate 23, a prism sheet 24, and a diffuser sheet 25. The traditional diffuser plate 23 adopts a surface coating processing to form lines. The optical simulation result of the backlight module 20 is shown in FIG. 7B. It can be seen that the effect of astigmatism is not ideal, and the shape of the LED array 22 can also be seen, which has a poor light performance.

Therefore, how to solve the above problems is worth consideration for those with ordinary knowledge in this field.

SUMMARY OF THE INVENTION

An optical film is provided in the present invention, which has a triangular pyramid structure to provide a better astigmatism effect.

An optical film is provided in the present invention, which includes a first surface and a second surface. The first surface includes a plurality of triangular pyramid structures, the triangular pyramid structure has a vertex, and the vertex extends toward a second surface. The second surface includes a plurality of orthogonal curved structures.

An optical film is provided in the present invention, which includes a first surface, a second surface and a plurality of triangular pyramid structures. The triangular pyramid structure is disposed on the first surface and the second surface. The triangular pyramid structure includes a vertex extending toward a horizontal plane of a center of the optical film.

In the above-mentioned optical film, a cross section of the triangular pyramid structure is an equilateral triangle or an isosceles triangle.

A backlight module is further provided in the present invention. The backlight module includes a substrate, a diffuser plate, and a plurality of above-mentioned optical films. A plurality of light sources is disposed on the substrate. The optical films are disposed between the substrate and the diffuser plate or on the diffuser plate.

A backlight module is further provided in the present invention. The backlight module includes a substrate, a prism sheet, and a plurality of above-mentioned optical films. A plurality of light sources is disposed on the substrate. The optical films are disposed between the substrate and the prism sheet or on the prism sheet.

In the above-mentioned backlight module, the plurality of optical films includes a group consisting of at least one thin optical film and at least one thick optical film.

In the above-mentioned backlight module, a thickness of the thin optical film is 0.05-0.5 mm, and a thickness of the thick optical film is 0.5-2.0 mm.

In the above-mentioned backlight module, a thickness of the optical film is 0.05-2.0 mm.

In the above-mentioned backlight module, the first surface of the optical film faces the diffuser plate, and the second surface of the optical film faces the light sources.

In the above-mentioned backlight module, the light source is a mini light emitting diode (Mini LED).

DESCRIPTION OF THE PREFERRED EMBODIMENTS

An optical film is provided in the present invention. An inverted triangular pyramid structure is arranged on the surface of the optical film. The light penetrating the optical film can be effectively diverged and has good penetration. The power requirement for light penetration is low.

Figure 1A:
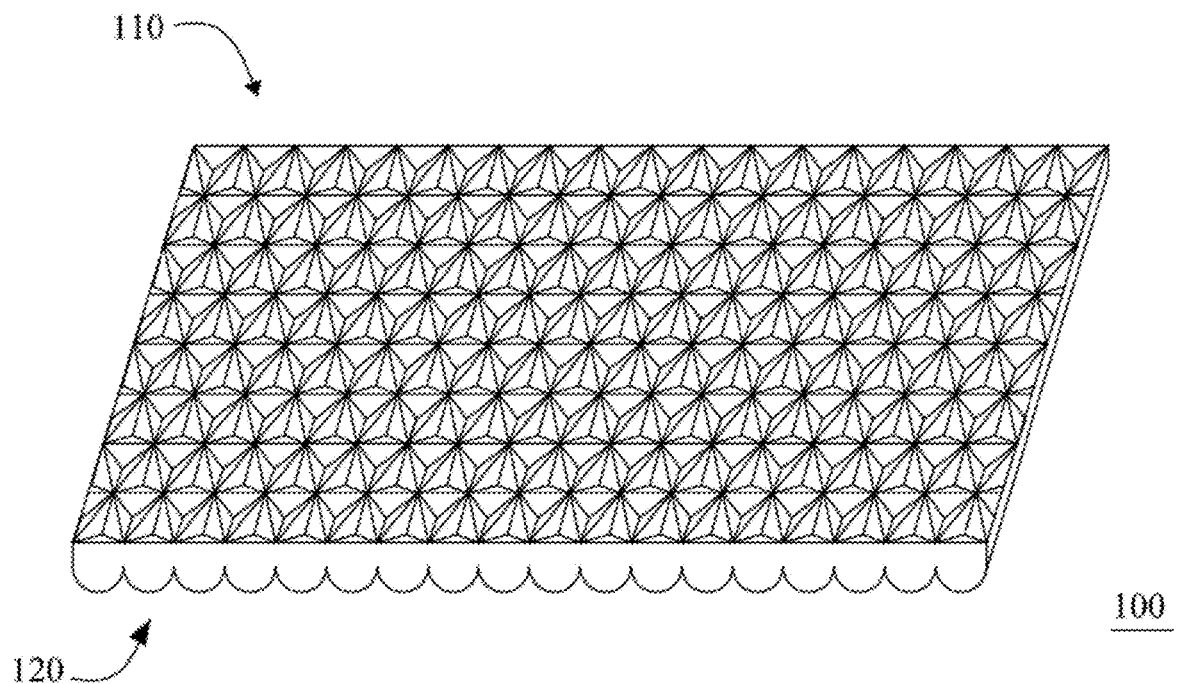
FIG. 1A is a diagram of an optical film of the present invention.

Please refer to FIG. 1A. FIG. 1A is a diagram of an optical film of the present invention. The optical film 100 of the present invention includes a first surface 110 and a second surface 120. The first surface 110 and the second surface 120 are disposed opposite to each other, and respectively represent two surfaces of the optical film 100. The second surface 120 is an incident surface of light, and the first surface 110 is an emission surface of light.

Figure 1B:
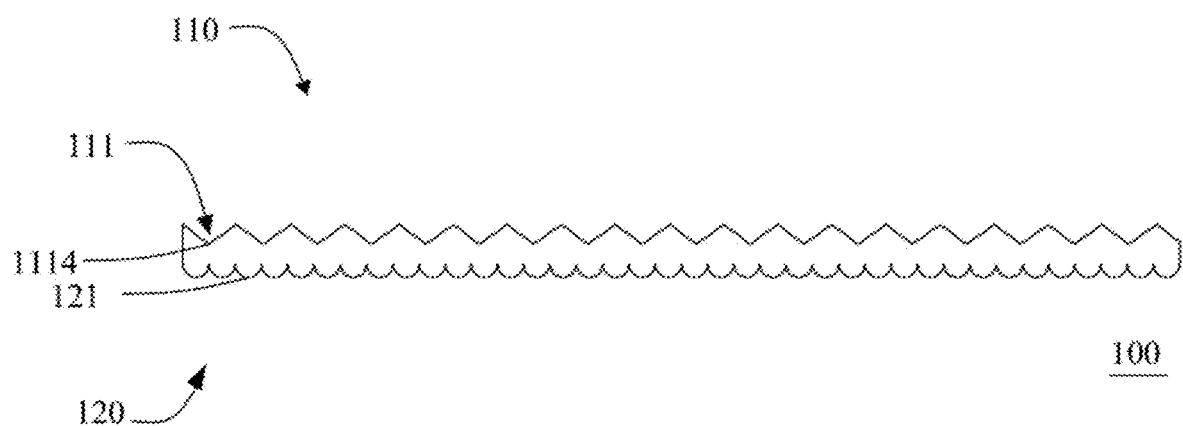
FIG. 1B is a side cross-sectional view of the optical film.
Figure 1C:
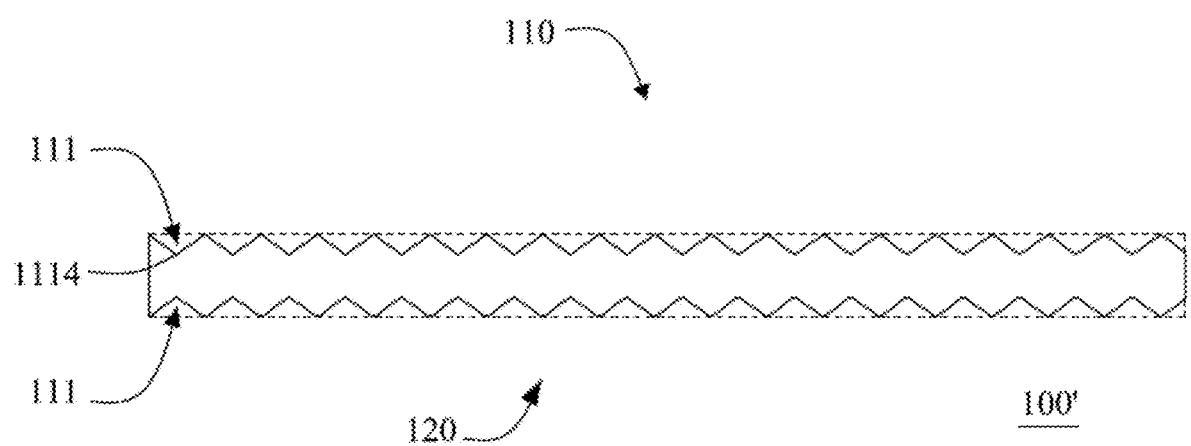
FIG. 1C is a diagram of an optical film according to another embodiment.

Please refer to FIG. 1B. FIG. 1B is a side cross-sectional view of the optical film. The first surface 110 further includes a plurality of triangular pyramid structures 111, the triangular pyramid structure 111 further includes a concave vertex 1114, and the concave vertex 1114 extends toward the second surface 120. In other words, the first surface 110 has a plurality of concave triangular pyramid structures 111. The second surface 120 has a plurality of orthogonal curved structures 121. Please refer to FIG. 1C. FIG. 1C is a diagram of an optical film according to another embodiment. In the embodiment of FIG. 1C, a plurality of triangular pyramid structures 111 are disposed on both the first surface 110 and the second surface 120. That is, both surfaces of the optical film 100' are provided with corresponding concave triangular pyramid structures 111. Therefore, the concave vertexes 1114 of the triangular pyramid structures 111 of the first surface 110 and the second surface 120 extend toward a horizontal plane in the optical film 100'.

Figure 2A:
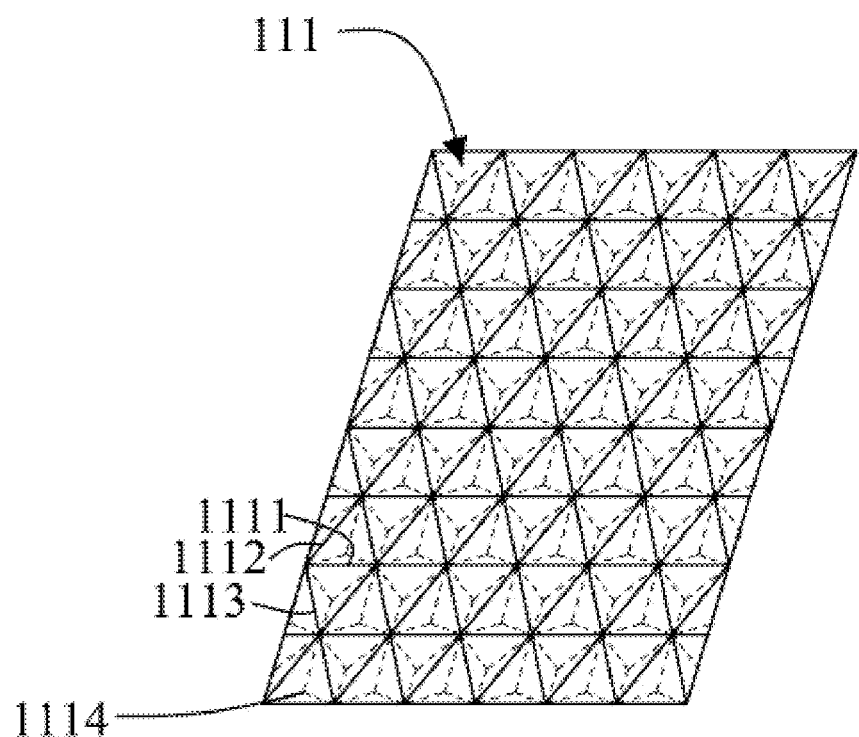
FIG. 2A is a diagram of a triangular pyramid structure.

Please refer to FIG. 2A. FIG. 2A is a diagram of a triangular pyramid structure. In a preferred embodiment, the first surface 110 includes a plurality of first ridgelines 1111, a plurality of second ridgelines 1112 and a plurality of third ridgelines 1113. The plurality of first ridgelines 1111 are arranged in parallel with each other, the plurality of second ridgelines 1112 are arranged in parallel with each other, and the plurality of third ridgelines 1113 are arranged in parallel with each other. That is, the ridgelines having the same direction will not intersect with each other. The angle between the first ridgeline 1111 and the second ridgeline 1112 is 60 degrees, the angle between the second ridgeline 1112 and the third ridgeline 1113 is 60 degrees, and the angle between the first ridgeline 1111 and the third ridgeline 1113 is 60 degrees. Therefore, the first ridgeline 1111, the second ridgeline 1112, and the third ridgeline 1113 constitute the sides of the triangular pyramid structure 111, wherein the cross section of the triangular pyramid structure 111 forms an equilateral triangle.

Figure 2B:
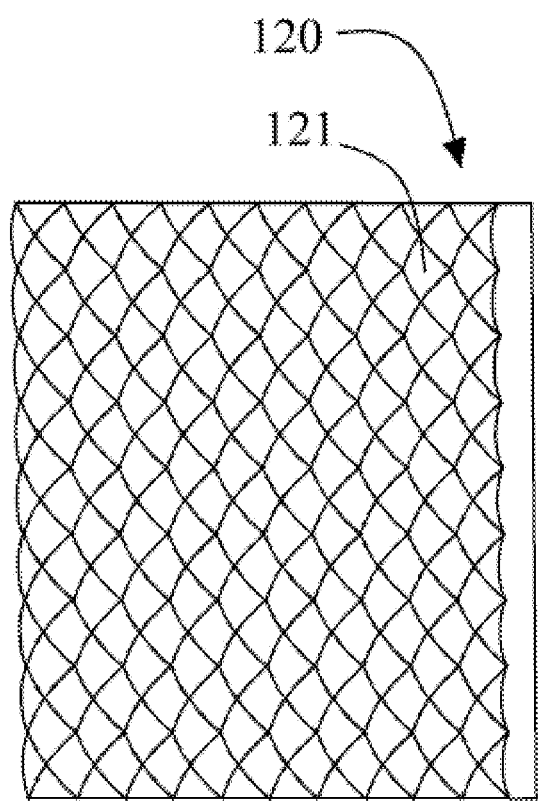
FIG. 2B is a diagram of a cylindrical structure.

Please refer to FIG. 2B. FIG. 2B is a diagram of a cylindrical structure. The second surface 120 includes a plurality of orthogonal curved structures 121, and the orthogonal curved structure 121 is a slightly diamond-shaped protrusion structure arranged on the second surface 120.

Figure 2C:
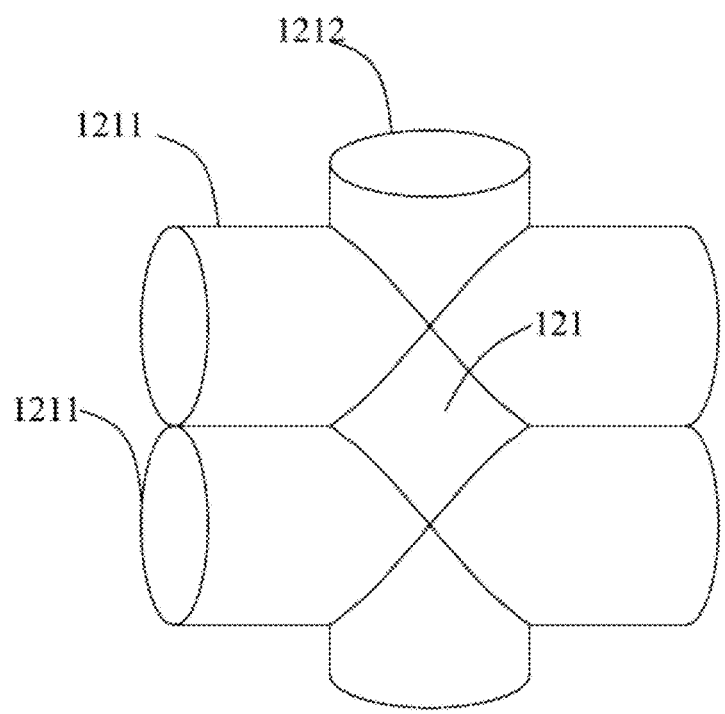
FIG. 2C is a diagram showing how orthogonal curved surface structures are defined.

Please refer to FIG. 2C. FIG. 2C is a diagram showing how orthogonal curved surface structures are defined. In this invention, the definition of the orthogonal curved structure 121 is equivalent to a curved surface formed by staggering a plurality of longitudinal cylinders 1211 and a plurality of transverse cylinders 1212. Specifically, the plurality of longitudinal cylinders 1211 are arranged orthogonally and the plurality of horizontal cylinders 1212 are arranged orthogonally, wherein the curved surface formed by the surface at the intersection is the orthogonal curved structure 121.

Hence, the first surface 110 (i.e., the emission surface) of the optical film is a surface composed of a plurality of triangular pyramid structures 111. The second surface 120 (i.e. the incident surface) of the optical film is a surface composed of a plurality of orthogonal curved structures 121.

Figure 3:
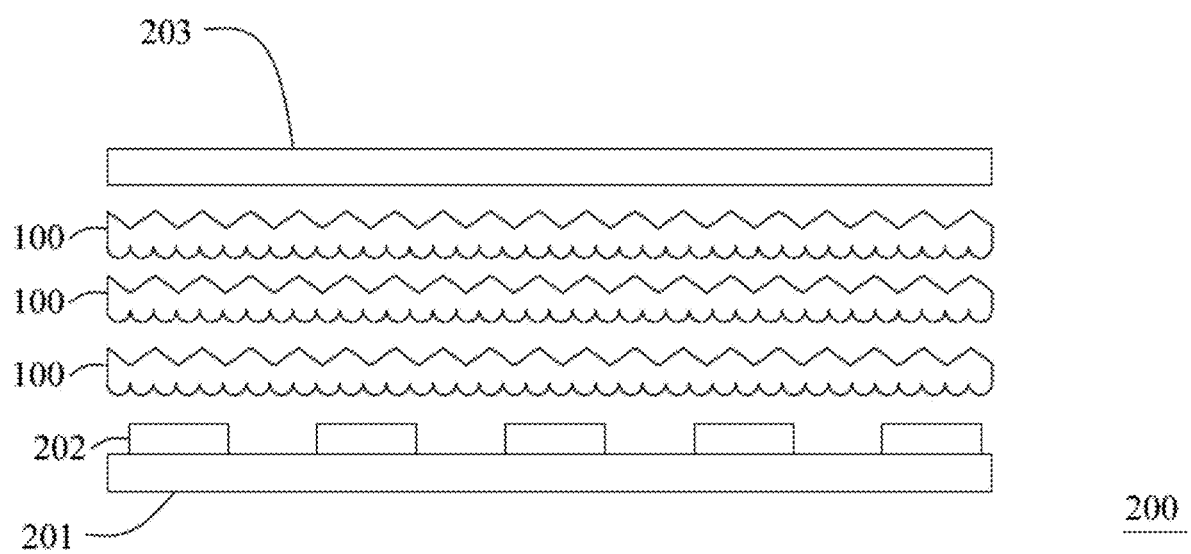
FIG. 3 is a diagram of a backlight module.

Please refer to FIG. 3. FIG. 3 is a diagram of a backlight module. The backlight module 200 includes a substrate 201, a diffuser plate 203 and a plurality of the above-mentioned optical films. A plurality of light sources 202 are arranged on the substrate 201, and the light sources 202 are, for example, Mini light emitting diodes (Mini LEDs). Therefore, the plurality of light sources 202 forms a light emitting array (a Mini LED array). The diffuser plate 203 is a normal diffuser, and a thickness of the diffuser plate 203 is 0.05 mm~2 mm.

The optical film 100 shown in FIGS. 1A o 2B is disposed between the diffuser plate 203 and the substrate 201. The first surface 110 of the optical film 100 faces the diffuser plate 203, and the second surface 120 faces the substrate 201 and the light sources 202. In this way, the light emitted by the light sources 202 can enter the optical film 110 from the second surface 120 and can exit the optical film 100 from the first surface 110. The triangular pyramid structures 111 on the first surface 110 and the cylindrical structures 121 on the second surface 120 can evenly diffuse the light. The graphics presented are softer.

In this embodiment, there may be a plurality of optical films 100, and the thickness of the plurality of optical films may also be different. The number and the thickness of the optical films 100 can be adjusted according to the carrier of the backlight module 200, such as a mobile device, a laptop computer, or a vehicle screen.

Figure 4A:
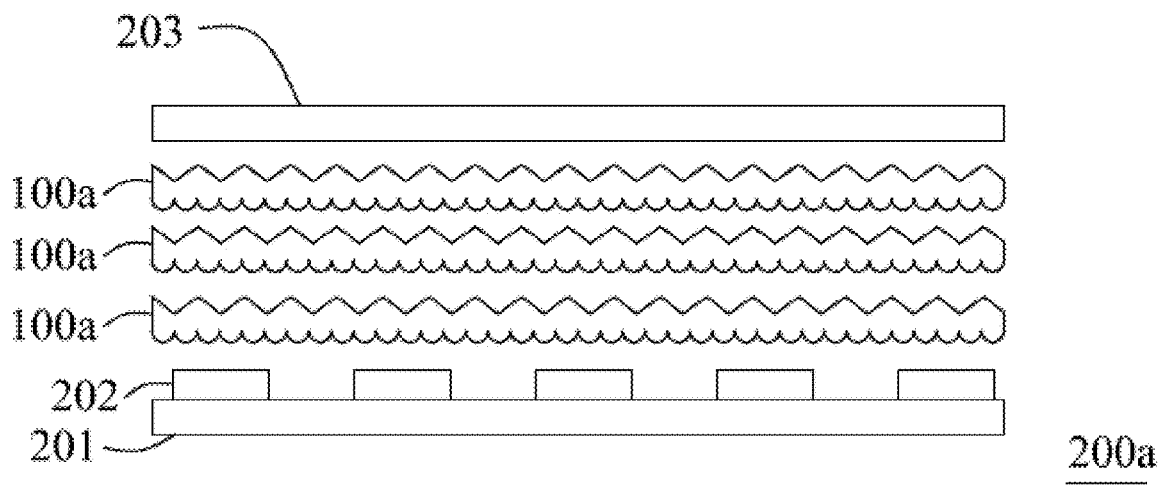
FIGS. 4A-4E are diagrams of backlight modules for different applications.
Figure 4B:
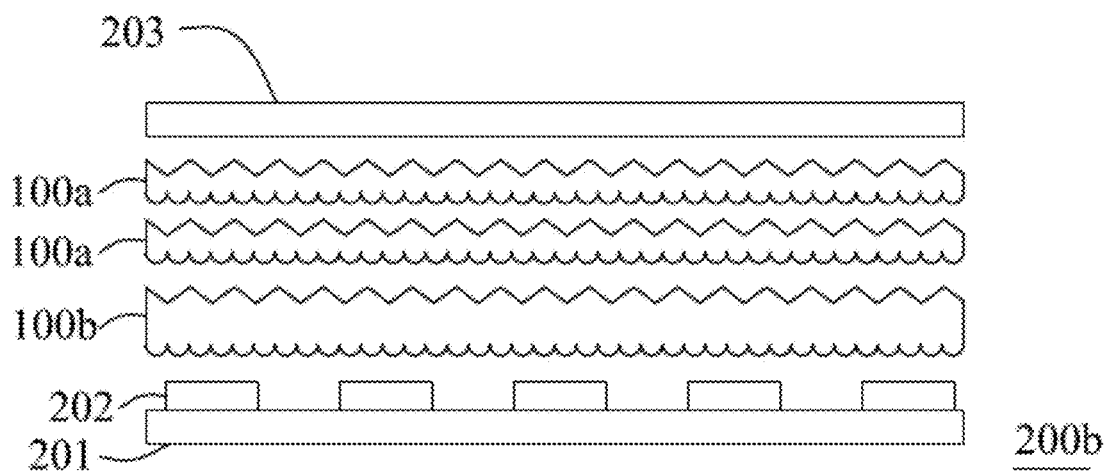
Figure 4C:
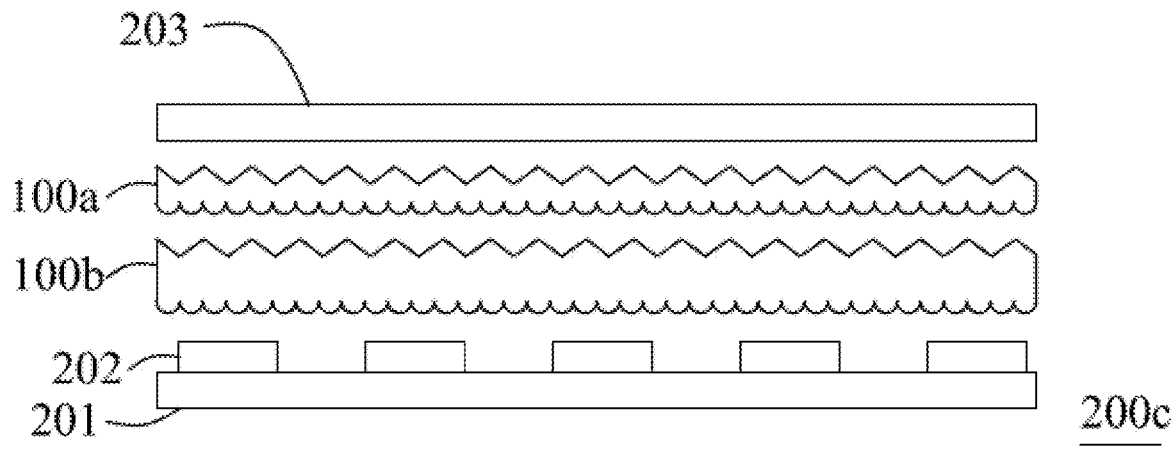

Please refer to FIGS. 4A-4E. FIGS. 4A-4E are diagrams of backlight modules for different applications. FIG. 4A is a backlight module 200a applied to a mobile device. Since the mobile device has the requirement on device thickness, three thin optical films 100a are disposed in the backlight module 200a, so that the thickness of the backlight module 200a can be reduced. FIG. 4B is a backlight module 200b applied to a laptop computer. Compared with a mobile device, the laptop computer has more space in thickness. Therefore, two thin optical films 100a and one thick optical film 100b are configured to provide a better astigmatism effect. FIG. 4C is a backlight module 200c applied to a vehicle screen, and the vehicle screen has a special requirement, so that a thin optical film 100a and a thick optical film 100b are configured to maintain its thickness and astigmatism effect. Therefore, the number and the thickness of the plurality of optical films 100 in the backlight module 200 can be adjusted and combined according to the requirements of the carrier. In this embodiment, the thickness of the optical film is in the range of 0.05-2.0 mm. Further, the above-mentioned thin optical film 100a has a thickness of 0.05-0.5 mm, and the thick optical film 100b has a thickness of 0.5-2.0 mm.

Figure 4D:
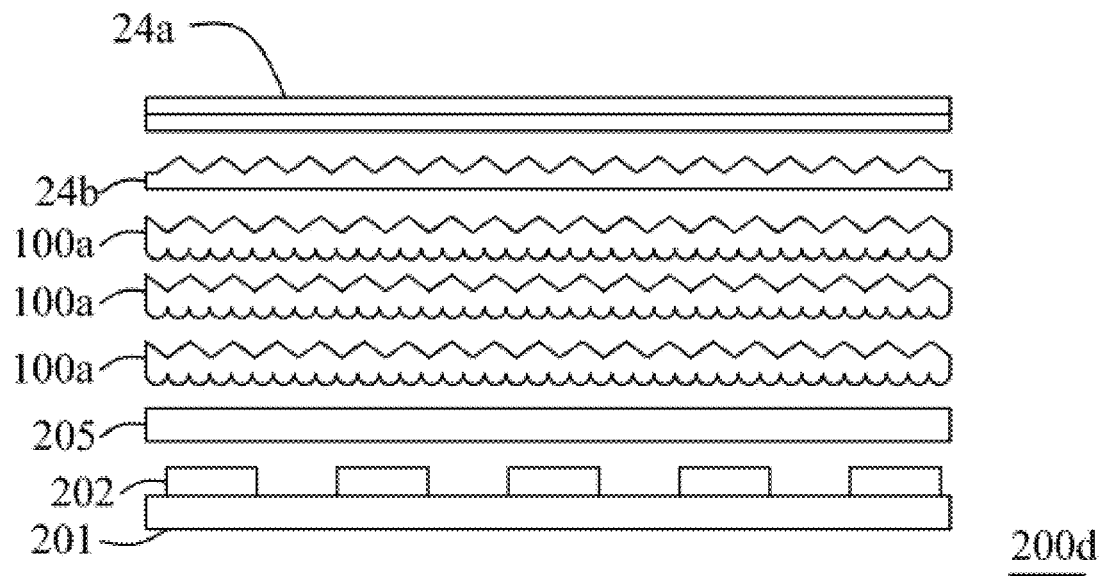

FIG. 4D is a backlight module 200d according to another embodiment. In the embodiment of FIG. 4D, the backlight module 200d has three thin optical films 100a, which are arranged above the substrate 201. But the backlight module 200d does not have a diffuser plate 203 at the top as shown in FIG. 4C. Two prism sheets 24a and 24b are disposed on the backlight module 200d, wherein the extending directions of the prism sheets 24a and 24b are perpendicular to each other. Further, the backlight module 200d further includes a quantum do film (QD film) 205, which is disposed between the optical film 100a and the substrate 201 That is, the first surface of the optical film 100a faces the prism sheets 24a and 24b, and the second surface of the optical film 100a faces the light sources 202 and the quantum dot film 205.

Figure 4E:
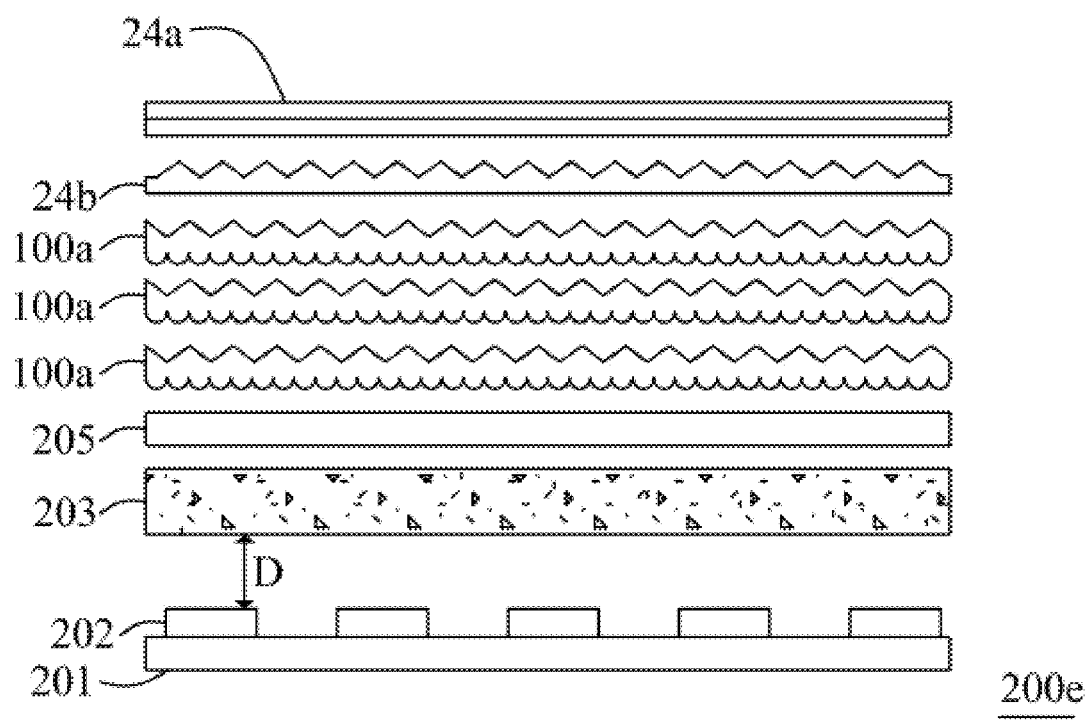

FIG. 4E is a backlight module 200e according to still another embodiment. The backlight module 200e is similar to the backlight module 200d. The backlight module 200e also has two prism sheets 24a and 24b, three thin optical films 100a and a quantum dot film 205. The main difference between the backlight module 200e and the backlight module 200d is that, it further includes a diffuser plate 203. The diffuser plate 203 is disposed between the quantum dot film 205 and the substrate 201. That is, the first surface of the optical film 100a faces the prism sheets 24a and 24b; the second surface of the optical film 100a faces the light sources 202 and the diffuser plate 203. In addition, there is a distance D between the diffuser plate 203 and the substrate 201, and the preferred distance D is 1.5-5 mm. Further, the above-mentioned quantum dot film 205 can also be replaced with a fluorescent film.

Figure 5:
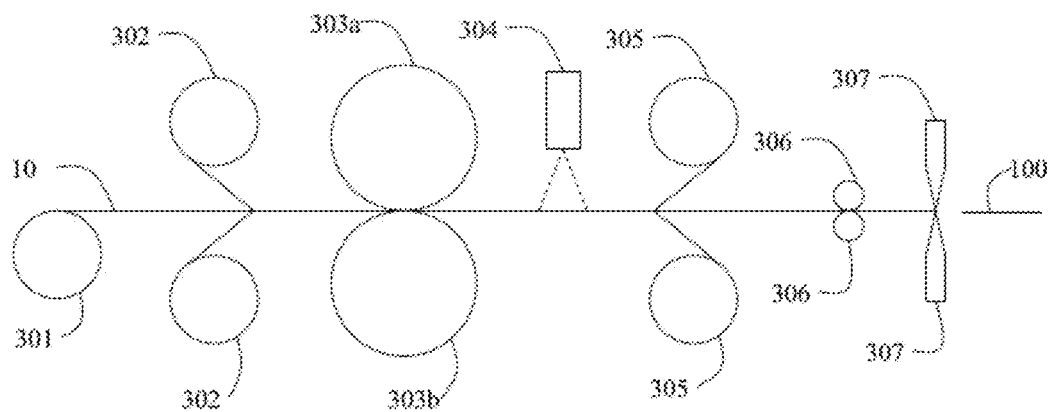
FIG. 5 is a diagram showing the manufacturing method of the optical film.

Please refer to FIG. 5. FIG. 5 is a diagram showing the manufacturing method of the optical film. First, a roll 301 is used to wind up the raw material 10, such as polycarbonate (PC), and the raw material 10 is rolled out during production. Next, upper rollers and lower rollers 302 peel off the protective film on the raw material 10. Next, the surface of the raw material 10 is processed by structure wheels 303a and 303b.

The structure wheel 303a on the upper side has a pattern corresponding to the triangular pyramid structure 111, and the structure wheel 303b on the lower side has a pattern corresponding to the cylindrical structure 121. Therefore, the triangular pyramid structure 111 and the cylindrical structure 121 can be formed on the upper surface and the lower surface of the raw material 10.

Next, an online defect inspection device (Automated Optical Inspection, AOI) 304 is used to detect whether the triangular pyramid structure 111 and the cylindrical structure 121 on the upper surface and the lower surface are correctly formed, or whether there are defects. After confirming that there is no defect, a protective film is pasted on the raw material 10 by the protective film roller 305. Then, a cutting wheel 306 cuts off the excess raw material 10 on two sides. After that, the raw material 10 is cut by a cutter 307 according to the required length, and then edges of front and rear sections are cut and corrected again to complete the production of the optical film 100.

Figure 6A:
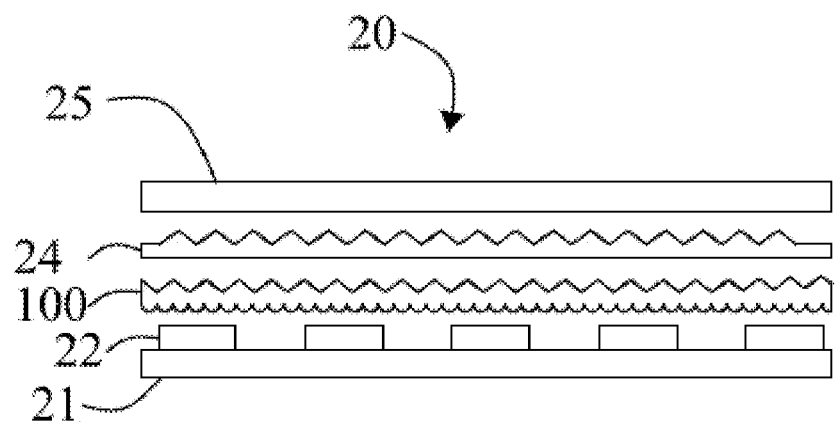
FIG. 6A is a diagram of a backlight module using the optical films.
Figure 6B:
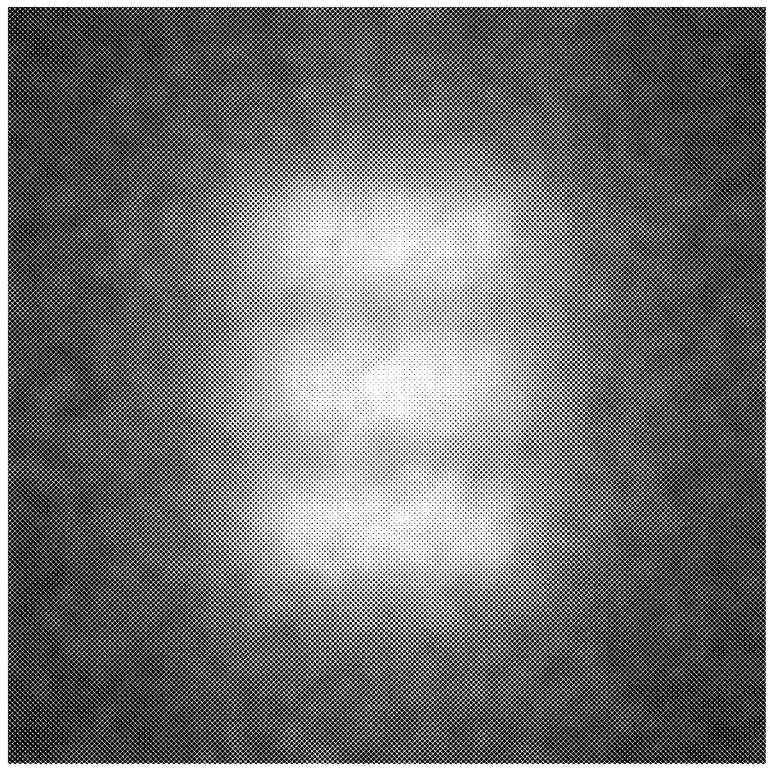
FIG. 6B is a diagram showing the optical simulation result.
Figure 7A:
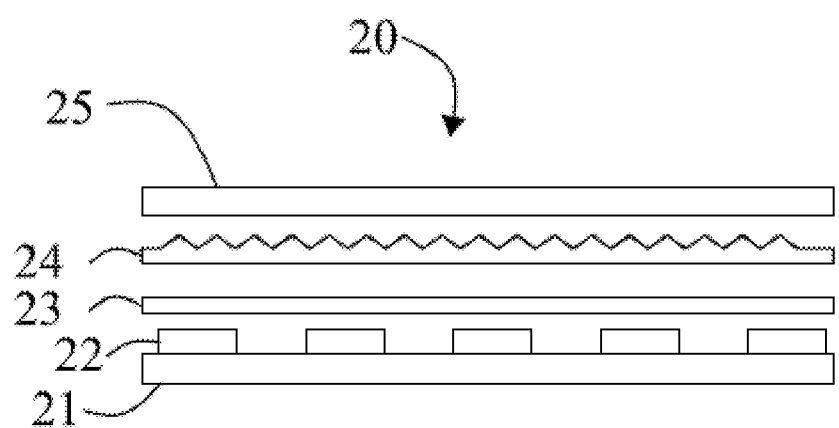
FIG. 7A is a diagram of a backlight module.
Figure 7B:
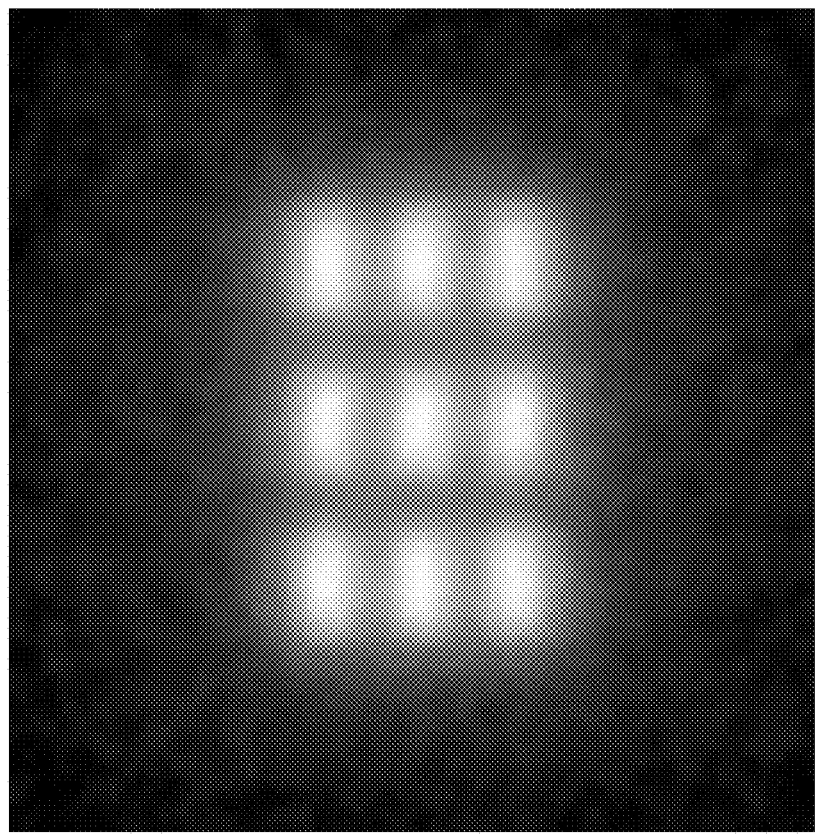
FIG. 7B is a diagram showing the optical simulation result.

The optical film 100 of the present invention uses a grating formed by a cylindrical structure 121 as an incident surface, and uses a triangular pyramid structure 111 as an emission surface. In this way, the astigmatism effect of the light can be more effectively improved, the light transmittance can be better, and the power consumption of the light sources 202 can be reduced. In addition, the optical film 100 can also adjust the astigmatism effect with the thickness and the number of stacks according to the manufacturing requirements of the backlight module 200, and can be applied to different backlight modules 200. Please refer to FIG. 6A and FIG. 6B. FIG. 6A is a diagram of a backlight module 200 using the optical films 100, and FIG. 6B is a diagram showing the optical simulation result. As can be seen from FIGS. 6A and 6B, by replacing the traditional diffuser plate 23 in the backlight module 20 with the optical film 100 of the present invention, the light can be more effectively dispersed and the light can behave more evenly during optical simulation.

What is claimed is:

1. An optical film, comprising:
a first surface;
a second surface, corresponding to the first surface;
a plurality of concave triangular pyramid structures, disposed on the first surface; and
a plurality of orthogonal curved structures, disposed on the second surface;
wherein each of the concave triangular pyramid structures has a concave vertex, and the concave vertex extends toward the second surface.

2. The optical film according to claim 1, wherein a cross section of the concave triangular pyramid structure is an equilateral triangle or an isosceles triangle.

3. A backlight module, comprising:
a substrate on which a plurality of light sources is disposed;
a diffuser plate, corresponding to the substrate, wherein the light sources extend toward the diffuser plate; and
a plurality of optical films disposed between the substrate and the diffuser plate or on the diffuser plate;
wherein each of the optical films comprises:
a first surface;
a second surface, corresponding to the first surface;
a plurality of concave triangular pyramid structures, disposed on the first surface; and
a plurality of orthogonal curved structures, disposed on the second surface;
wherein each of the concave triangular pyramid structures has a concave vertex, and the concave vertex extends toward the second surface.

4. The backlight module according to claim 3, wherein each of the plurality of optical films comprises a group consisting of at least one thin optical film and at least one thick optical film.

5. The backlight module according to claim 4, wherein a thickness of the thin optical film is 0.05-0.5 mm, and a thickness of the thick optical film is 0.5-2.0 mm.

6. The backlight module according to claim 3, wherein a thickness of the optical film is 0.05-2.0 mm.

7. The backlight module according to claim 3, wherein the light source is a mini light emitting diode.

8. A backlight module, comprising:
a substrate on which a plurality of light sources are disposed;
at least one prism sheet, corresponding to the substrate, wherein the light sources extend toward the prism sheet; and
a plurality of optical films disposed between the substrate and the prism sheet;
wherein each of the optical films comprises:
a first surface;
a second surface, corresponding to the first surface; and
a plurality of concave triangular pyramid structures, disposed on the first surface; and
a plurality of orthogonal curved structures, disposed on the second surface;
wherein each of the concave triangular pyramid structures has a concave vertex, and the concave vertex extends toward the second surface.

9. The backlight module according to claim 8, wherein the plurality of optical films comprises a group consisting of at least one thin optical film and at least one thick optical film.

10. The backlight module according to claim 9, wherein a thickness of the thin optical film is 0.05-0.5 mm, and a thickness of the thick optical film is 0.5-2.0 mm.

11. The backlight module according to claim 8, wherein a thickness of the optical film is 0.05-2.0 mm.

12. The backlight module according to claim 8, wherein the light source is a mini light emitting diode.

13. The backlight module according to claim 8, further comprising:
a diffuser plate, wherein the first surface of the optical film faces the prism sheet, and the second surface of the optical film faces the light sources.

14. The backlight module according to claim 13, further comprising:
a quantum dot film, wherein the first surface of the optical film faces the prism sheet, and the second surface of the optical film faces the quantum dot film.

15. The backlight module according to claim 13, further comprising:

a fluorescent film, wherein the first surface of the optical film faces the prism sheet, and the second surface of the optical film faces the fluorescent film.

16. The backlight module according to claim 8, further comprising:
a quantum dot film, wherein the first surface of the optical film faces the prism sheet, and the second surface of the optical film faces the quantum dot film.

17. The backlight module according to claim 8, further comprising:
a fluorescent film, wherein the first surface of the optical film faces the prism sheet, and the second surface of the optical film faces the fluorescent film.

18. The backlight module according to claim 8, wherein a cross section of the concave triangular pyramid structure is an equilateral triangle or an isosceles triangle.

* * * * *